3,193,590
METHOD OF PREPARING ORGANOLITHIUM POLYMERIZATION INITIATORS
Henry L. Hsieh, Bartlesville, Okla., assignor to Phillips Petroleum Company, a corporation of Delaware
No Drawing. Filed Aug. 10, 1961, Ser. No. 130,462
6 Claims. (Cl. 260—665)

This invention relates to an improved polymerization initiator. In another aspect it relates to a method of preparing a polymerization initiator. In still another aspect this invention relates to a method of preparing reactive polymers using an improved initiator composition.

It has been disclosed in copending application Serial No. 772,167 of Uraneck, Short, Hsieh and Zelinski, filed November 6, 1958, now Patent No. 3,135,716, that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal groups on the ends of the polymer molecules enables substantially more effective cures since all of the molecule can be tied into the cross-linked structure. Also by simple coupling arrangements alone or with auxiliary curing, liquid polymers can be readily converted into solids, and soft tacky polymers can be made quite rigid. The term "telechelic" has been coined to define these terminally reactive polymers. As used in this specification, telechelic polymers mean polymers of vinylidene-containing monomers which contain a reactive group on each end of the polymer molecule.

The concentration of reactive groups in a telechelic polymer can be adjusted by regulating the amount of initiator used in the polymerization. In other words by increasing the amount of initiator used, it is possible to obtain a polymer composition having a larger number of reactive end groups. I have now discovered a more efficient initator for the preparation of telechelic polymers. This initiator has an increased number of lithium atoms present in its composition so that less of the initiator need be employed to produce telechelic polymers having a higher concentration of reactive end groups.

According to my invention an improved polymerization initiator is prepared by reacting lithium with a halogenated condensed ring aromatic compound. The resulting composition contains a higher number of lithium atoms per molecule of condensed ring aromatic compound than the number of halogen atoms originally present in the halogenated condensed ring aromatic compound. I have also discovered that in order for this improved initiator to be formed, the reaction between the lithium and the halogenated condensed ring aromatic compound should be carried out at least in part at a temperature above 0° F., preferably in two stages with the temperature of the first stage being below 0° F. and the temperature of the second stage above 0° F. According to another aspect of my invention this improved initiator is employed in the polymerization of vinylidene-containing monomers. The lithium atoms present in the resulting polymer are then replaced with stable reactive groups to produce a highly useful telechelic polymer.

It is an object of my invention to provide an improved polymerization initiator. Another object is to provide a method of preparing an organolithium polymerization initiator containing at least three lithium atoms per molecule of organic aromatic compound employed in the preparation thereof. Still another object is to provide an improved method of polymerizing vinylidene-containing monomers to produce telechelic polymers having a high concentration of reactive groups. Other objects, advantages, and features of my invention will be apparent to those skilled in the art from the following discussion.

The polymerization initiators of this invention are prepared by reacting lithium with a halogenated condensed ring aromatic compound. These halogenated condensed ring aromatic compounds are the mono- and polyhalogenated naphthalenes, anthracenes, and phenanthrenes, and the alkyl-substituted derivatives thereof. These compounds can be represented by the formulas

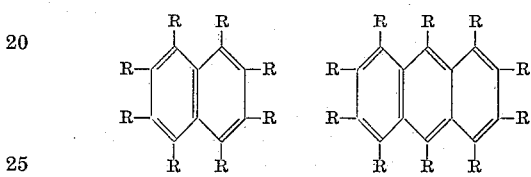

and

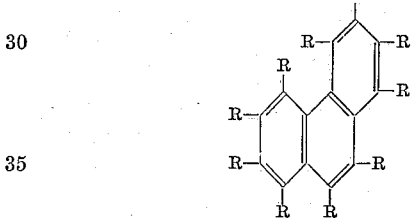

wherein from 1 to 4 R groups of each compound are halogen, and each of the remaining R groups is selected from the group consisting of hydrogen and alkyl groups having 1 to 4 carbon atoms, there being not more than 12 carbon atoms in the total of the R groups. Examples of such compounds include
1-chloronaphthalene,
2-chloronaphthalene,
1,2-dichloronaphthalene,
1,3-dichloronaphthalene,
1,4-dichloronaphthalene,
1,5-dichloronaphthalene,
1,8-dichloronaphthalene,
1,2,3-trichloronaphthalene,
1,2,7,8-tetrachloronaphthalene,
1-bromonaphthalene,
2-fluoronaphthalene,
1,4-diiodonaphthalene,
1-chloroanthracene,
1,4-dichloroanthracene,
9,10-dibromoanthracene,
1,4,5,8-tetrafluoroanthracene,
1,2-diiodoanthracene,
1-chlorophenanthrene,
2-chlorophenanthrene,
9-bromophenanthrene, 1,4,5-tribromophenanthrene,
9,10-dichlorophenanthrene,
3-methyl-1-chloronaphthalene,
4,5-diethyl-1,2-dichloronaphthalene,
5,8-di-n-propyl-1,4-dichloronaphthalene,
2-tert-butyl-1,5-dichloronaphthalene,
5,6,7-tri-n-butyl-1,4-dichloroanthracene,
9,10-dimethyl-1,4,5,8-tetrabromoanthracene,
9,10 - dimethyl - 7-ethyl-1,4-dichloro-5-iodophenanthrene,
and the like.

Of the above-described types of compounds the chlorinated derivatives and especially the mono- and dichloro compounds are preferred. Mixtures of the above-named compounds can also be employed with good results. For example, mixtures of dichloronaphthalenes can be used as effectively as any one of the dichloronaphthalenes alone. The mono- and dichloronaphthalenes have been found particularly useful in the practice of this invention.

The initiators are prepared by contacting lithium in any desired form such as wire, chunks, shot or in a finely divided state with the halogenated condensed ring aromatic compound in a suitable solvent, preferably an aliphatic monoether. The methoxy ethers and cyclic ethers such as tetrahydrofuran and dioxane should be avoided since they are too active. The aliphatic monoethers can be used individually or as mixtures and are represented by the formula ROR in which R is an alkyl group containing from 2 to 12 carbon atoms. Compounds which are representative of these ethers include diethyl ether, di-n-propyl ether, diisopropyl ether, ethyl isopropyl ether, ethyl n-butyl ether, di-n-butyl ether, isopropyl tert-butyl ether, n-propyl n-butyl ether, di-n-amyl ether, diisoamyl ether, di-n-hexyl ether, di(2-ethylhexyl) ether, dioctyl ether, isopropyl octyl ether, didecyl ether, didodecyl ether, ethyl dodecyl ether, di-tert-butyl ether, di(2,4,6-trimethyloctyl) ether, di(2,4-diisopropylhexyl) ether, and the like.

The reaction can be carried out with either mild or vigorous agitation in an inert atmosphere such as argon or nitrogen. An excess of lithium should be employed, generally at least 50 percent excess over that required to yield a product containing the maximum number of lithium atoms per molecule of initiator.

I have found that temperature is an important factor in the preparation of the lithium initiator in order to obtain a composition containing the maximum number of lithium atoms per molecule of condensed ring aromatic compound within a reasonable length of time. During at least a portion of the reaction the temperature should be above 0° F. Also, it is desirable to initiate the reaction at a temperature below 60° F. It is preferred that the initial portion of the reaction be conducted below 0° F. and that the final portion of the reaction period be carried out at the higher temperatures. When the temperature of the reaction mixture is held below 0° F., for example, in the range of about −40 to 0° F., a reaction product is formed containing two lithium atoms per molecule of the original halogenated condensed ring aromatic compound, but further reaction is very slow. When the temperature of the mixture is increased, the reaction continues so that the resulting composition contains additional lithium atoms. While temperatures up to around 170° F. can be used, it is generally preferred to operate below 150° F. The time required for the formation of the polylithium initiator depends upon such factors as temperature, rate of agitation, and concentration of the solution. In general the time can vary over a broad range, for example, from about 10 minutes to 100 hours or longer. The time for each stage of the two-stage reaction can readily be determined from the alkalinity of a sample of the reaction mixture. For example, when the alkalinity indicates the presence of about 2 lithium atoms per molecule of aromatic compound, the temperature can be raised above 0° F. for the second stage.

The following table illustrates possible temperature selections to obtain the desired reaction product in a minimum amount of time:

| Temperature, ° F. | Rate of reaction | |
| --- | --- | --- |
| | First half | Last half |
| 122 | Very slow | Very fast. |
| 86 | Slow | Fast. |
| 41 | Fast | Fast. |
| −15 | Very fast | Very slow. |

The efficiency of the polylithium initiators for the production of telechelic polymers can be increased by stabilizing the initiator with a small amount of monomer such as a conjugated diene or an aromatic monomer. This monomer can be added after the polylithium reaction product had been formed, or it can be charged along with the other reactants used in preparing the initiator. Suitable monomers are those which are subsequently described in connection with the formation of the telechelic polymer with the polylithium initiator. The amount of monomer employed in this stabilizing step is ordinarily in the range of 2 to 10 moles, preferably about 2 to 6 moles, per mole of halogenated condensed ring aromatic compound.

If it is desired that the telechelic polymer have a relatively low vinyl content, for example, configuration resulting from 1,2-addition or 3,4-addition of 1,3-butadiene, the polar solvent employed in preparing the initiator should be removed prior to adding the initiator to the polymerization mixture. A substantial portion of this polar solvent can be removed by purging with nitrogen or other inert gas and a hydrocarbon diluent can then be added. Alternatively, the hydrocarbon diluent can be added to the solution of initiator in the polar solvent and the polar solvent then removed by distillation.

The above-described organolithium initiators can be employed to prepare a wide variety of homopolymers, random copolymers or block copolymers. In these polymerization reactions the preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2 - methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2 - ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed in the practice of our invention and preferred monomers are butadiene, isoprene and piperylene.

In addition to the conjugated dienes other monomers containing a $CH_2=C<$ group such as the vinyl-substituted aromatic compounds can be used. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is gnerally not greater than 12. Examples of these aromatic monomers include: 3-methylstyrene(3-vinyltoluene), 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tert-butylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 3-decoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinylnaphthalene, 2,4-diisopropyl-1-vinylnaphthalene, 3,6-di-p-tolyl-1-vinylnaphthalene, 6-cyclohexyl-1-vinylnaphthalene, 4,5-diethyl-8-octyl-1-vinylnaphthalene, 3,4,5,6-tetramethyl-1-vinylnaphthalene, 3,6-di-n-hexyl-1-vinylnaphthalene, 8-phenyl-1-vinylnaphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinylnaphthalene, 4-o-tolyl-2-vinylnaphthalene, 5-(3-phenyl-n-propyl)-2-vinylnaphthalene, 4-methoxy-1-vinylnaphthalene, 6-phenoxy-1-vinylnaphthalene, 3,6-dimethylamino-1-vinylnaphthalene, 7-hexoxy-2-vinylnaphthalene, and the like. These vinyl-substituted aromatic compounds can be used to form homopolymers or copolymers including block copolymers with each other or with conjugated dienes. The presence of a small amount of polar compound such as the solvent used in preparing the initiator encourages random copolymerization between conjugated dienes and the vinyl-substituted aromatic compounds.

Certain polar monomers can also be polymerized to form homopolymers or copolymers with each other. These polar monomers can be employed to form block copolymers with conjugated dienes and/or vinyl-substituted aromatic compounds. When preparing these block copolymers the polar monomer is introduced after the non-polar monomers have polymerized. A detailed description of block copolymers containing terminal reactive groups and their method of preparation is set forth in the copending application of R. P. Zelinski, Serial No. 796,277, March 2, 1959, now abandoned. These polar monomers include vinylpyridines and vinyl quinolines in which the vinyl group is attached to a ring carbon other than a carbon in the beta position with respect to the nitrogen. These pyridines, quinolines or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include: 2-vinylpyridine, 4-vinylpyridine, 3,5-diethyl-4-vinylpyridine, 5-methyl-2-vinylpyridine, 5-n-octyl-2-vinylpyridine, 3-n-dodecyl-2-vinylpyridine, 3,5-di-n-hexyl-4-vinylpyridine, 5-cyclohexyl-2-vinylpyridine, 4-phenyl-2-vinylpyridine, 3,5-di-tert-butyl-2-vinylpyridine, 3-benzyl-4-vinylpyridine, 6-methoxy-2-vinylpyridine, 4-phenoxy-2-vinylpyridine, 4-dimethylamino-2-vinylpyridine, 3,5-dimethyl-4-diamylamino-2-vinylpyridine, 2-vinylquinoline, 4-vinylquinoline, 2-tert-butyl-4-vinylquinoline, 3-methyl-4-vinylquinoline, 3-cyclohexyl-4-vinylquinoline, 3-methyl-4-ethoxy-2-vinylquinoline, 1-vinylisoquinoline, 3-vinylisoquinoline, 4-tert-dodecyl-1-vinylisoquinoline, 3-dimethylamino-3-vinylisoquinoline, 4-benzyl-3-vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropl ethacrylate, acrylonitrile, methacrylonitrile, N,N-dimethylacrylamide, N,N - dimethylmethacrylamide and the like. Vinylfuran and N-vinylcarbazole can also be used.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semisolid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. Preferably the amount of initiator is in the range of about 1 to about 40 millimoles per 100 grams of monomers. It is preferred that the polymerization be carried out in the presence of a suitable diluent which is predominantly hydrocarbon, such as benzene, toluene, cyclohexane, methylcyclohexane, xylene, n-butane, n-hexane, n-heptane, isooctane, and the like. Generally, the diluent is selected from hydrocarbons, e.g., paraffins, and aromatics containing from 4 to 10 carbon atoms per molecule. It should be understood that relatively small amounts of other materials can be present, such as the ethers in which the initiator was dissolved, or a polar compound which is charged to encourage random copolymerization.

At the end of the polymerization the polymers contain lithium atoms at the ends of the molecule. These polymers are then reacted with agents to introduce various reactive groups in place of the lithium atoms. While these lithium atoms which are present in the polymer are reactive, the product is relatively unstable since in the presence of moisture the lithium atoms are rapidly replaced with hydrogen resulting in polymers which are no longer reactive in the sense discussed here. Various reagents can be used to place other reactive groups on the ends of the polymer molecule, thereby producing stable telechelic polymers which can be conveniently processed and cured at the most opportune time. A wide variety of reactive groups is possible in the telechelic polymers of this type. One of the most practical classes of terminally reactive groups contains reactive hydrogen, for example, hydrogen attached to oxygen, sulfur or nitrogen. Examples of such groups containing hydrogen include:

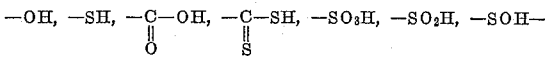

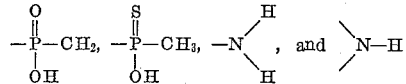

Other such end groups include phosphinic or thiophosphinic acid end groups and other acidic groups such as POOH, $SeO_2H$, $SeO_3H$, $SiO_2H$, $SnO_2H$, $SbO_2H$, SbOH, $SbO_3H_2$, $TeO_2H$, $TeO_3H$, $AsO_2H$, AsOH, $AsO_3H_2$, $AsO_3H_3$. Examples of other reactive groups are those containing a reactive halogen in which the halogen is attached to carbon or sulfur with the carbon carrying the halogen being singly bonded to oxygen or sulfur, multiply bonded to oxygen or sulfur or alpha to a carbonyl group, a thiono group

an ethylene group

or a carbon group in an aromatic ring. Examples of end groups of this type include:

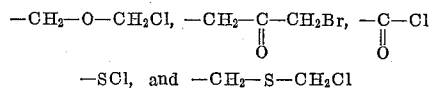

Examples of other reactive end groups are those containing reactive double or triple bonds, for example, an oxygen, sulfur or nitrogen attached to carbon by a multiple bond. Examples of these reactive groups include: cyano (—C≡N), imino (=NH), formyl

thionoformyl

acyl

and thionacyl

wherein R is a hydrocarbon radical.

A number of different methods can be used to substitute the above reactive groups for the lithium atoms in the polymer. For example, the lithium telechelic polymer can be reacted with carbon dioxide and thereafter with an acid such as hydrogen chloride to produce a polymer containing terminal carboxy groups. Sulfuryl chloride can be used to produce polymers containing terminal $SO_3H$ groups. Other reactants which can be employed to replace the lithium atoms with reactive groups are carbon disulfide, sulfur dioxide, disodium chlororesorcinate, acetone, methyl ethyl ketone, phenyl methyl ketone, benzyl ethyl ketone, p-tolyl n-propyl ketone, acetyl chloride, propionyl chloride, butyryl bromide, benzoyl chloride, α-cyclohexylacetyl chloride, ethyl acetate, methyl propionate, cyclohexyl butyrate, ethyl benzoate, phenyl acetate, p-tolyl propionate, 2-butenyl acetate, dimethyl formamide, dimethyl acetamide, diethyl benzamide, diphenyl formamide, diethyl 3-cyclohexylpropionamide, methyl chloromethyl ketone, propyl bromoethyl ketone, phenyl chlorophenyl ketone, cyclohexyl bromopropyl ketone, acetonitrile, propionitrile, butyronitrile, 2-cyclohexyl acetonitrile, benzonitrile, p-methyl benzonitrile, ethyl isocyanide, n-butyl isocyanide, n-decyl isocyanide, 2-(4-methylcyclohexyl)ethyl isocyanide, methyl isocyanate, propyl isocyanate, phenyl isocyanate, benzyl isocyanate, p-tolyl isocyanate, n-pentyl isothiocyanate, 2-hexyl isothiocyanate, butenyl isothiocyanate, xylyl isothiocyanate, benzoquinone, 2-methylbenzoquinone, 4-bromocyclohexanone, ketene, ethylketene, phenylketene, cyclohexylketene, and the like. Cyclic disulfides can be employed to prepare mercapto telechelic polymers and phosphonic dihalides or thiophosphonic dihalides can be employed to prepare the polymers containing terminal phosphinic or thiophosphinic acid end groups. Epoxy compounds can be employed to prepare polymers containing terminal hydroxy groups, and polymers containing terminal alkali metal atoms can be reacted with compounds containing the structure

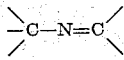

to prepare polymers containing terminal nitrogen groups which are active in quaternizing reactions.

The telechelic polymers can be combined with plasticizers and carbon black or mineral fillers and cured with any polyfunctional compound known to react with the reactive groups present in the polymer. For example, with polymers containing terminal acid groups, such as carboxy groups, aziridinyl compounds can be used as curatives, e.g. triaziridinyl phosphine oxides or sulfides or multifunctional aziridinyl triazines or triphosphatriazines. Polyfunctional alcohols, acids, halides, amines, ketones, isocyanates, epoxides, and the like can be employed with the appropriate reactive end group of the polymer. The organic radicals of the polyfunctional curatives are preferably aliphatic, cycloaliphatic or aromatic hydrocarbon radicals containing from 1 to 36 carbon atoms. Conventional curing agents can be employed as auxiliary curatives. These curatives are known to react by crosslinking across the double bonds of a diene polymer, such as sulfur and sulfur compounds and organic peroxides like benzoyl peroxide or dicumyl peroxide. Examples of polyfunctional coupling agents which can be used include glycerol, mannitol, hemimellitic acid, pyromellitic dianhydride, 1,3,5-trichlorobenzene, benzene-1,3,5-triisocyanate, polyarylpolyisocyanate having an average of 3 isocyanate groups per molecule and a molecular weight of about 380 (PAPI-1, a product of Corwin Chemical Company), 2,4,6-heptanetrione, tri(1-aziridinyl)phosphine oxide, tri(2-methyl-1-aziridinyl)phosphine oxide, tri(2-methyl-1-aziridinyl)phosphine sulfide, 2,4-di(1-aziridinyl),1,3,5-triazine, 2,4,6-tri(1-aziridinyl)2,4,6-triphospha-1,3,5-triazine, phenyl-bis(2-methyl-1-aziridinyl)phosphine sulfide, bis(2-methyl-1-aziridinyl)sulfoxide, bis(1-aziridinyl) sulfone, bis(1,2-propylene)1,3-urea, bis(1,2-propylene)adipamide, and the like.

By selecting the proper monomer, initiator, curative and additive, a wide variety of products can be produced by the above-described method. The products are useful as potting compounds, caulking compounds, in the manufacture of molded items and various laminated structures, and can also be used as binders for various types of solids. Polymers can be prepared which are quite fluid in the uncured state, thereby avoiding many fabrication problems. In order to illustrate the advantages of my invention the following examples are presented. The proportions and conditions in these examples are given as being typical only and should not be construed to limit my invention unduly.

*Example I*

A series of lithium-dichloronaphthalene reaction products was prepared in accordance with the following recipe:

Dichloronaphthalene [1], mole _____ 0.05 (9.9 grams).
Lithium wire _____ Excess.
Diethyl ether, ml. _____ 100.
Temperature, °F. _____ Variable.
Time, hours _____ Variable.

[1] Commercial mixture of dischloronaphthalenes obtained from Eastman Kodak Company.

The reactions were carried out in an atmosphere of nitrogen. Alkalinity was determined by withdrawing a sample and titrating it with 0.1 N hydrochloric acid. The following table gives a summary of the runs:

TOTAL ALKALINITY, N

| Run No. | Temp., °F. | Hours | | | | | | | Theoretical concn., M |
|---|---|---|---|---|---|---|---|---|---|
| | | 1.5 | 3 | 18 | 22 | 26 | 42 | 58 | |
| 1 | 122 | 0 | 0 | 0.12 | 0.20 | 0.22 | 0.40 | 1.70 | 0.46 |
| 2 | 86 | 0 | 0 | 0.39 | 0.55 | 1.22 | 1.95 | 2.05 | 0.46 |
| 3 | 41 | 0.12 | 0.14 | 0.90 | | | 1.72 | 1.80 | 0.46 |
| 4 | −15 | 0.80 | 0.85 | 0.85 | | | | 1.05 | 0.46 |

If one lithium atom replaced each chlorine of the dichloronaphthalene, the theoretical normality should be 0.92 (theoretical molarity of 0.46). The foregoing data show that at −15° F., the reaction occurs rapidly and the normality approaches this value in a relatively short reaction period. Even after 58 hours there was very little change. At the higher temperatures, the reaction is slower in the initial stages but the final product, calculated from normality, corresponds to around 4 gram atoms of lithium per mole of dichloronaphthalene (calculated values are 3.7, 4.6, and 3.9 respectively).

Butadiene was polymerized using the lithium-dichloronaphthalene initiator described in run 2. The following recipe was used:

| | |
|---|---|
| 1,3-butadiene, parts by weight | 100 |
| Cyclohexane, parts by weight | 780 |
| Initiator, millimoles | 1.3 |
| Temperature, °F. | 122 |
| Time, hours | 4 |

Polymerization was effected in an atmosphre of nitrogen. After a 4-hour reaction period 8.4 parts by weight (200 millimoles) per 100 parts of butadiene charged of ethylene oxide was aded to the polymerization mixture and the reaction was continued for 48 hours at 122° F. The mixture was acidified with hydrochloric acid, washed with water, and the hydroxy-terminated polymer coagulated with isopropyl alcohol and dried in a vacuum oven.

Samples of the hydroxy-containing polymer were cured using tolylene-2,4-diisocyanate and PAPI-1 (a polyaryl polyisocyanate, product of Corwin Chemical Company). In each case one part by weight of curative per 100 parts polymer was used and the compositions were cured 30 minutes at 307° F. The following inherent viscosity and gel values were obtained:

| | Original | Tolylene-2,4-diisocyanate | PAPI-1 |
|---|---|---|---|
| Inherent viscosity | 1.61 | [1] 1.80 | [1] 1.98 |
| Gel, percent | 0 | 43 | 59 |

[1] Determined on soluble portion.

The formation of gel is indicative of cross-linking in the polymer.

*Example II*

The following recipe was employed for the preparation of a lithium-dichloronaphthalene reaction product:

| | |
|---|---|
| Dichloronaphthalene, mole | 0.10 (19.8 grams). |
| Lithium wire, gram atom | 0.80. |
| Diethyl ether, ml. | 180. |

The reaction was started at −15° F. and the temperature maintained at that level for 104 hours after which it was increased to 86° F. The total alkalinity was measured at intervals by withdrawing a sample of the reaction mixture and titrating it with 0.1 N hydrochloric acid. The calculated molar concentration of the reaction product was 0.5. Results are shown in the folowing table:

| Temp., °F. | Time, hours | Total alkalinity, N | Theoretical concn., M | N/M |
|---|---|---|---|---|
| −15 | 24 | 1.1 | 0.5 | 2.2 |
| −15 | 48 | 1.2 | 0.5 | 2.2 |
| −15 | 104 | 1.35 | 0.5 | 2.7 |
| 86 | 152 | 2.02 | 0.5 | 4 |

These data show that a product containing 4 gram atoms of lithium per mole of naphthalene is readily obtained by reacting lithium with dichloronaphthalene first at a low temperature and then completing the reaction at a higher temperature.

*Example III*

Two runs were made for the reaction of lithium with dichloronaphthalene. Recipes used were as follows:

| | Run 1 | Run 2 |
|---|---|---|
| Dichloronaphthalene, mole | 0.10 | [1] 0.10 |
| Lithium shot | excess | excess |
| Diethyl ether, ml | 180 | 180 |
| Temperature, °F | 41 | 41 |
| Time, hours | 30 | 120 |
| Theoretical concentration, M | 0.5 | 0.5 |
| Total alkalinity, N [2] | 2.0 | 2.0 |
| N/M | 4 | 4 |

[1] 19.8 grams.
[2] Determined by titration of a sample with 0.1 N hydrochloric acid.

The data show that each reaction product contained 4 lithium atoms per mole of naphthalene.

The product from run 2 was treated with 0.5 mole of butadiene in an attempt to stabilize the lithium atoms on the naphthalene molecule. The temperature was maintained at 41° F. for one hour after addition of the butadiene.

Each of the stabilized and unstabilized reaction products was employed in a series of runs for the polymerization of butadiene in accordance with the following recipes:

| | A | B |
|---|---|---|
| 1,3-butadiene, parts by weight | 100 | 100 |
| Toluene | 1,000 | 860 |
| Initiator from run 1 | variable | |
| Stabilized initiator from run 2 | | variable |
| Temperature, °F | 122 | 122 |
| Time, hours | 2 | 2 |

Charge order for run A: Toluene, nitrogen purge, butadiene, initiator.

Charge order for run B: Toluene, nitrogen purge, stabilized initiator, butadiene.

Both reaction mixtures were treated with carbon dioxide, then acidified with hydrochloric acid, and washed. A summary of the runs is shown in the following table:

| Run No. | Initiator level, Mmole [1] | Brookfield visc., poises at 77° F. | COOH, percent |
|---|---|---|---|
| A1 | 15 | >4,000 | 0.74 |
| A2 | 30 | 760 | 1.57 |
| A3 | 40 | 520 | 1.81 |
| B4 | 20 | 784 | 1.58 |
| B5 | 30 | 532 | 2.28 |
| B6 | 40 | 352 | 2.82 |

[1] Based on the assumption that one mole of initiator was formed per mole of dichloronaphthalene charged.

These data show that carboxy telechelic polymers prepared with the stabilized initiator gave products with a higher carboxy content at the same initiator level than those prepared with the initiator that was not stabilized.

The products from runs B4, 5, and 6 were cured with tri-(2-methyl-1-aziridinyl)phosphine oxide. The amount of curative employed was 110 percent, based on the carboxy content. The temperature was maintained at 160° F. for 72 hours after which inherent viscosity and gel were determined. Results were as follows:

| Run No. | No curative | | Tri-(2-methyl-1-aziridinyl) phosphine oxide | |
|---|---|---|---|---|
| | Inh. visc. | Gel, percent | Inh. visc.[1] | Gel, percent |
| B4 | 0.18 | 0 | 0.29 | 71.0 |
| B5 | 0.15 | 0 | 0.17 | 74.6 |
| B6 | 0.12 | 0 | | 76.7 |

[1] Determined on soluble portion.

These data show that considerable cross-linking occurred by reaction of the curative with the carboxy groups in the polymers.

Example IV

Two runs were carried out for the reaction of lithium with dichloronaphthalene. The recipes and results were as follows:

|  | A | B |
|---|---|---|
| Dichloronaphthalene, mole | 0.05 | 0.05 |
| Lithium shot | excess | excess |
| Diethyl ether, ml | 90 | 80 |
| Tetrahydrofuran, ml | 0 | 10 |
| Temperature, °F | 41 | 41 |
| Time, hours | 72 | 72 |
| Theoretical concentration, M | 0.5 | 0.5 |
| Total alkalinity, N (HCl titration) | 1.92 | 0.72 |
| N/M | 4 | 1.4 |

These data show that an active ether such as tetrahydrofuran has a deleterious effect in the system.

Products from runs A and B were employed as initiators for the polymerization of butadiene. In each case 100 parts by weight of 1,3-butadiene and 780 parts by weight of cyclohexane were used. The initiator level was varied. Polymerization temperature was 122° F. and time was one hour. Subsequent to polymerization the reaction mixtures were treated with carbon dioxide as in Example III. Results were as follows:

| Run | Initiator level, Mmoles | Initiator | Brookfield visc. at 77° F. poises | COOH, percent |
|---|---|---|---|---|
| 1 | 20 | A | 164 | 1.90 |
| 2 | 40 | A | 142 | 2.78 |
| 3 | 20 | B | 648 | 0.63 |
| 4 | 40 | B | 330 | 0.96 |

The original initiator solution was treated with 6 moles of butadiene per mole of initiator at 86° F. for 0.5 hour prior to being charged to the polymerization.

These data show again that tetrahydrofuran was detrimental, as evidenced by the low carboxy content.

Example V

The recipe of Example II was employed for the preparation of a reaction product of lithium with dichloronaphthalene except that lithium shot was used instead of lithium wire. The reaction was first effected at 41° F. for 72 hours after which the temperature was increased to 86° F. and continued for 24 additional hours. The product was prepared for gas chromatography and chlorine analyses by hydrolyzing it and washing it 8 times with deionized water to remove lithium hydroxide. Following are the results.

Original solution:
    Theoretical concentration, M --- 0.5.
    Total alkalinity, N ------------ 2.1.
    N/M ---------------------------- 4.
    Total lithium consumed, gram atom ------------------------- 0.63.
    Gram atoms Li consumed per mole dichloronaphthalene ---- 6.
Analyses:
    Chlorine ----------------------- None detected.
    Gas chromatogram ------------ Appeared to be naphthalene, no evidence of dihydronaphthalene or heavier materials.
    Melting point ------------------ 80° C. (naphthalene).

The above analyses are what would be expected from the hydrolysis of dilithionaphthalene prepared by the substitution of lithium for the chlorine in dichloronaphthalene. Although two other lithium atoms appeared to be present from the alkalinity of the initiator and the lithium consumed, tetralithionaphthalene definitely was not formed as shown by the absence of dihydronaphthalene on hydrolysis.

Example VI

Lithium was reacted with 1-chloronaphthalene for the preparation of a series of initiators. Data are presented below:

These data demonstrate that initiators containing 3 lithium atoms per molecule can be prepared using 1-chloronaphthalene.

|  | A | B | C |
|---|---|---|---|
| 1-chloronaphthalene, mole | 0.1 | 0.1 | 0.1 |
| Lithium wire, gram atoms | 0.8 | 0.8 | 0.8 |
| Diethyl ether, milliliters | 180 | 180 | 180 |
| Temperature, °F | 41 | 41 | 41 |
| Time, hours | 72 | 72 | 72 |
| followed by— |  |  |  |
| Temperature, °F | 86 | 86 | 86 |
| Time, hours | 24 | 24 | 24 |
| Theoretical concentration, M | 0.5 | 0.5 | 0.5 |
| Total alkalinity, N | 1.52 | 1.52 | 1.52 |
| N/M | 3 | 3 | 3 |
| Stabilization with butadiene: |  |  |  |
|   Butadiene, mole | [1] 0.4 | [1] 0.4 | [1] 0.4 |
|   Temperature, °F | 41 | 41 | 41 |

[1] Added in two increments, each 15 minutes apart.

Example VII

The stability of a lithium-dichloronaphthalene reaction product upon aging was studied. The recipe employed is the same as in Example II. The reaction temperature was maintained at −15° F. for 104 hours followed by 86° F. for 48 hours. Total alkalinity of the reaction product, determined by hydrochloric acid titration, was 2.02, indicating that the product contained 4 lithium atoms per mole of naphthalene. Ether was removed by nitrogen purging and the residue was dissolved in toluene. Portions of this initiator were aged for one, two, and three weeks respectively. The original and each of the aged products were employed for the polymerization of butadiene in accordance with the following recipe:

1,3-butadiene, parts by weight ------------------ 100
Toluene, parts by weight ----------------------- 860
Initiator, millimoles -------------------------- 15
Temperature, °F. ------------------------------- 122
Time, hour ------------------------------------- 1

Toluene was charged first, the reactor was purged with nitrogen, butadiene was added, and then the initiator. Subsequent to polymerization, the reaction mixtures were carbonated as hereinbefore described. Results were as follows:

| Run No. | Aging time,[1] days | Brookfield visc. at 77° F. poises | COOH, percent |
|---|---|---|---|
| 1 | 0 | 1,000 | 0.94 |
| 2 | 7 | 908 | 0.94 |
| 3 | 14 | 924 | 0.95 |
| 4 | 21 | 850 | 1.09 |

[1] Room temperature.

These data show that the iniator has excellent stability at room temperature.

Example VIII

An attempt was made to prepare an initiator from sodium using the procedure of the previous examples and the following recipe:

Dichloronaphthalene, mole ---------------------- 0.05
Sodium metal, gram atom ----------------------- 0.40
Diethyl ether, ml. ---------------------------- 90
Temperature, °F. ------------------------------ 41

Time, hours ------------------------------------ 120
Theoretical concentration, M -------------------- 0.50
Total alkalinity, N ----------------------------- 0.90
N/M --------------------------------------------- 1.8

The above data shows that, unlike lithium, sodium does not form the tetrafunctional initiator.

As will be apparent to those skilled in the art various modifications can be made in my invention without departing from the spirit or scope thereof.

I claim:

1. A method of making a polymerization initiator which comprises reacting lithium with a halogenated condensed ring aromatic compound having a formula selected from the group consisting of

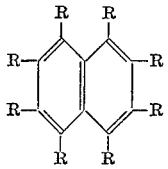 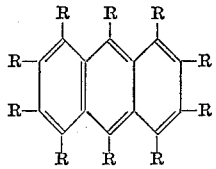

and

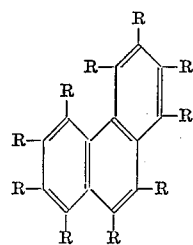

initially at a temperature below 60° F. with the temperature being above 0° F. for at least a portion of the reaction and for a time until the apparent number of lithium atoms per molecule of initiator as measured by the ratio of alkalinity to molarity (N/M) of the initiator is at least 1 greater than the number of halogen atoms per molecule of the original halogenated condensed ring aromatic compound.

2. A method of making a polymerization initiator which comprises reacting lithium metal with a halogenated condensed ring aromatic compound having a formula selected from the group consisting of

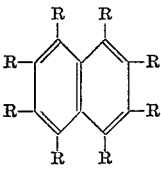 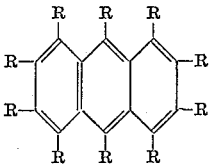

and

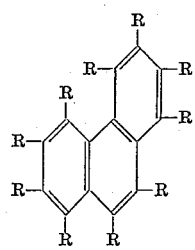

wherein 1 to 4 R groups of each compound are halogen and each of the remaining R groups is selected from the group consisting of hydrogen and alkyl groups having 1 to 4 carbon atoms, there being not over 12 carbon atoms in the total of said R groups, said reacting being carried out in a medium of aliphatic monoether having the formula R'OR' wherein each R' is an alkyl group containing from 2 to 12 carbon atoms and in an inert atmosphere initially at a temperature below 60° F. with the temperature being above 0° F. for at least a portion of the reaction and for a time until the apparent number of lithium atoms per molecule of initiator as measured by the ratio of alkalinity to molarity (N/M) of the initiator is at least 2 greater than the number of halogen atoms per molecule of the original halogenated condensed ring aromatic compound.

3. The method of claim 2 wherein said condensed ring aromatic compound is dichloronaphthalene.

4. The method of claim 2 wherein said condensed ring aromatic compound is 1-chloronaphthalene.

5. A method of claim 2, wherein the temperature of at least a portion of the reaction is above 25° F.

6. A method of making a polymerization initiator according to claim 2 wherein said lithium and halogenated condensed ring aromatic compounds are reacted in two stages, initially below 0° F. and finally above 0° F.

References Cited by the Examiner

UNITED STATES PATENTS 3,036,056   5/62   Rion ---------------- 260—94.7

FOREIGN PATENTS 339,243   12/30   Great Britain.
817,695   10/56   Great Britain.
1,159,498   11/56   France.
1,243,561   9/60   France.

JOSEPH L. SCHOFER, *Primary Examiner.*

MORRIS LIEBMAN, *Examiner.*

UNITED STATES PATENT OFFICE
CERTIFICATE OF CORRECTION

Patent No. 3,193,590           July 6, 1965

Henry L. Hsieh

It is hereby certified that error appears in the above numbered patent requiring correction and that the said Letters Patent should read as corrected below.

Column 13, line 35, before "initially" insert -- wherein 1 to 4 R groups of each compound are halogen and each of the remaining R groups is selected from the group consisting of hydrogen and alkyl groups having 1 to 4 carbon atoms, there being not over 12 carbon atoms in the total of said R groups, in a solvent of aliphatic monoether --; column 14, line 34, for "of", second occurrence, read -- is initially below 0° F. and for --.

Signed and sealed this 8th day of March 1966.

(SEAL)
Attest:

ERNEST W. SWIDER          EDWARD J. BRENNER
Attesting Officer           Commissioner of Patents